United States Patent Office 3,849,475
Patented Nov. 19, 1974

3,849,475
PURIFICATION OF HIGH BOILING ESTERS
Paul Biarnais, Melle, Claude Falize, Neuilly-sur-Seine, and Gilbert Sitaud, Melle, France, assignors to Rhone-Progil, Courbevoie, France
Filed Apr. 26, 1972, Ser. No. 247,592
Claims priority, application France, Apr. 26, 1971, 7115732
Int. Cl. C07c 69/80
U.S. Cl. 260—475 B     17 Claims

ABSTRACT OF THE DISCLOSURE

The purification of high boiling esters produced by reaction of an organic carboxylic acid or anhydride and a monohydric or polyhydric alcohol having at least 8 carbon atoms comprising heating the neutralized reaction product to a temperature within the range of 130–190° C. and separating the organic phase from the aqueous phase by decantation carried out at a temperature within the range of 120–200° C., under positive pressure.

---

Figure 1:
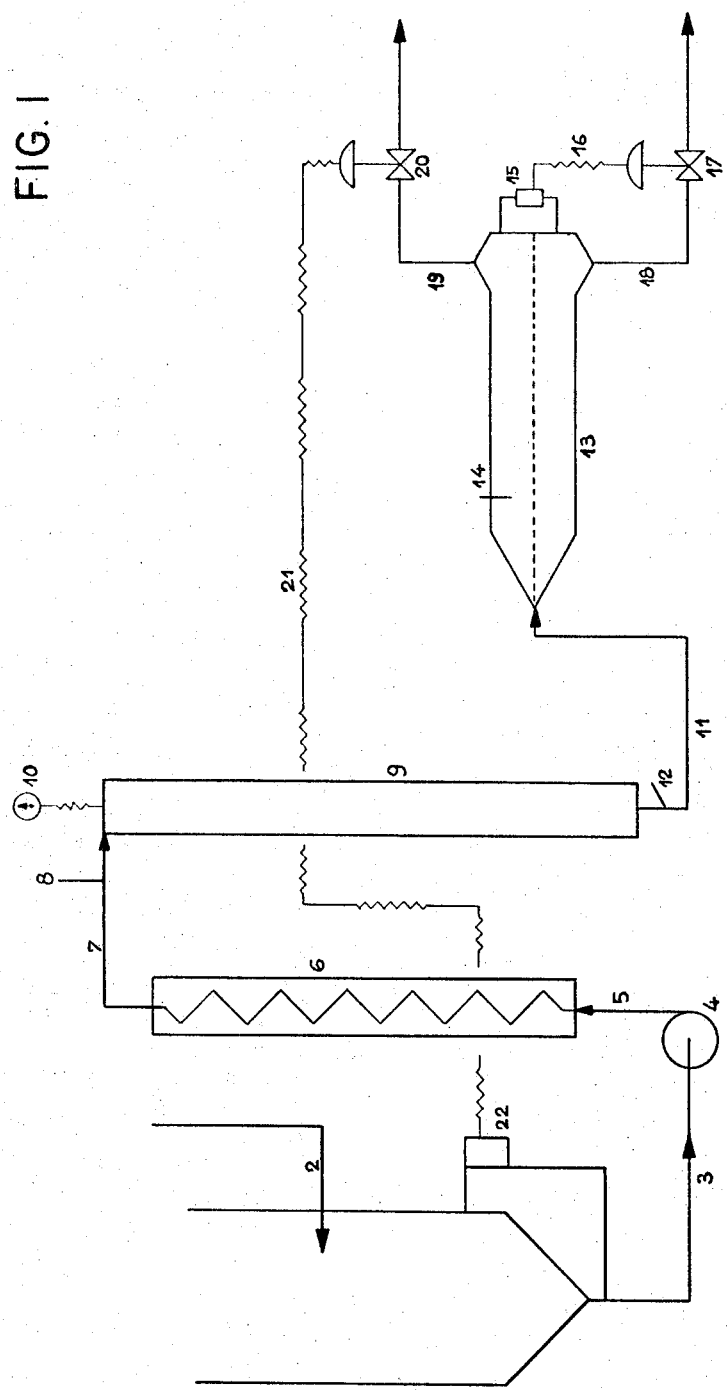

This invention relates to the purification of high boiling esters, particularly esters intended for use as plasticizers or lubricants. These are esters derived from the reaction of aromatic or aliphatic, monocarboxylic or polycarboxylic organic acids, such as phthalic acid, 2-ethyl hexanoic acid, adipic acid, sebacic acid, azelaic acid, trimellitic acid, etc., with aliphatic monohydric or polyhydric alcohols, such as hexanols, 2-ethyl hexanol, decanols, tridecanols, and the like alcohols having more than 8 carbon atoms.

Generally, after esterification of the organic carboxylic acid or its anhydride, with a monohydric or polyhydric alcohol, an alkaline reactant is used to neutrailze the traces of organic acid and/or alkyl hydrogen carboxylic acid esters and the acid by-products of the catalysis, such as alkyl hydrogen sulfate, if sulfuric acid is employed as an esterification catalyst. The subsequent purification of the high boiling water comprises, aside from the removal of the excess alcohol introduced for the esterification, the removal of the salts resulting from the neutralization.

The neutralization is ordinarily performed with sodium hydroxide or carbonate. Accordingly, the salts to be removed from the high boiling ester are generally sodium sulfates (disodium sulfate and/or sodium alkyl sulfate), sodium carbonates (disodium carbonate and sodium hydrogen carbonate), and the sodium salt or salts of the organic acids used for the esterification, such as disodium phthalate and sodium alkyl phthalate.

In U.S. Pat. No. 2,805,246, description is made of the purification of the ester concurrently with the neutralization of the acids and/or alkyl hydrogen esters, in a heating treatment at a temperature of 130–190° C., depending on the kind of high boiling ester. The treatment is advantageously carried out in the presence of a neutralizing agent, preferably sodium carbonate, which allows more complete destruction of the by-products resulting from the catalysis, especially the dialkyl sulfate, with corresponding stabilization of the high boiling ester.

In ordinary practice, after the neutralization and the stabilizing heat treatment, the removal of the salts is effected, using as a vehicle the water present in and/or introduced for this purpose into the neutralized mixture. The salts dissolve in the water and the aqueous phase is separated by decantation from the organic phase which contains the high boiling ester and, ordinarily, the excess alcohol introduced for the esterification reaction, and also, as the case may be, an auxiliary substance, such as a hydrocarbon which functions in the manner of an entrainer for the reaction water during the esterification step.

Complete removal of the salts requires several successive washing operations with pure water or, in continuous operation, a methodical washing in counter-current flow in a tower or column containing filling or contact materials.

The salt removal should be substantially complete in the case of esters, such as dialkyl phthalates or adipates, which are intended to be used as plasticizers in the preparation of insulating coverings or coatings for electrical equipment, such as cables and the like, or in the manufacture of containers for foodstuffs. As a matter of fact, the salts which remain even in very small amounts in the plasticizer assert an unfavorable influence on the heat stability of the plasticizer and on the stability of the resinous material containing such plasticizer. The degradation, which is more or less sensible, is revealed by a drop in resistivity of the plasticizer or of the plasticized resins, and by the appearance of discoloration in such products.

Comparatively simple tests can be made on the plasticizers to determine their stability towards heat, such as change in their electrical resistivity under these circumstances and the dielectric characteristics of plates of polyvinyl chloride plasticized with the esters.

Table I illustrates the harmful effect from the presence of alkali metal salts on the properties of di(2-ethyl hexyl) phthalate plasticizer.

This will illustrate the desire for substantially complete removal of the salts, and it is an object of this invention to provide a process for easier and more effective removal thereof.

The present invention is based on the discovery that separation through decantation of the salt containing aqueous phase from the organic phase, starting from the esterification product previously neutralized and heated to a temperature within the range of 130–190° C., is materially improved, from the standpoint of the speed and sharpness of the decantion and completeness of the salt removal, if the said operation is carried out at an elevated temperature, namely at a temperature within the range of 120–200° C. and preferably within the range of 150-190° C., instead of such moderate temperatures within the range of 60° to below 100° C.

In actual practice, the performance of the elevated temperature decantation results in the use of pressure to avoid boiling of the water of the azeotropic mixture of water with excess alcohol and/or of the azeotropic mixture of water with the water entrainer.

The above discovery does not dissociate a possible action of the pressure, from that of the temperature, on the improvement in the decantation and separation of the two phases. However, this point is without consequence in actual practice since, in any event, it is useful and simple to take advantage of pressure conveniently to perform the decantations at the aforementioned elevated temperatures.

In accordance with a preferred practice of this invention, after the elevated temperature decantation previously described, the organic phase is washed at least one time with hot water, preferably pure hot water. It is possible to perform the washing or washings, and the subsequent decantation or decantations respectively, which allow separation of the washed organic phase from the washing water or waters, at a temperature within the range of 60° to almost 100° C., under atmospheric pressure, with decantation of the phases under the same conditions as the corresponding washing step. Alternatively, it is possible to carry out any one of the washings, preferably the first one, and the subsequent decantation, under conditions similar to those of the first decantation, i.e. at a temperature of at least 100° C. and preferably within the range of 120–200° C., and more preferably within the range of 150–190° C., under positive pressure, preferably a pressure of the same order of magnitude as that existing during the first decantation.

As aforesaid, special advantage is found in use of the process of the present invention to perform the first

TABLE I

| | Alkali metal salt content | | Heating test, 180° C. for 6 hours | | | | |
|---|---|---|---|---|---|---|---|
| Nature of the alkali metal salt contained in the di(2-ethyl hexyl) phthalate | Milli-moles per liter | Mg. per liter | Color (APHA) change from the beginning to the end of the test | Final acidity (milli-moles per liter)[1] | Resistivity of the ester at 20° C. (10$^{12}$ ohm/cm.) | | Remarks |
| | | | | | Initial | Final | Resistivity[2] |
| Nil (reference product) | | | 0 | 3 | 2 | 1.2–1.5 | 3 | |
| Disodium phthalate | 0.05 | 10.5 | 0 | 2.9 | 1.13 | 0.2 | 2.91 | Solubility limit in the cold. |
| Disodium sulfate | 0.05 | 7.1 | 0 | 2.25 | 1.5 | 0.75 | 2.85 | |
| Disodium carbonate | 0.05 | 5.3 | 0 | 2.75 | 1.015 | 0.18 | 2.93 | |
| Sodium (2-ethyl hexyl)phthalate | 0.02 | 6.7 | 0 | 2.9 | 1.03 | 0.33 | 2.97 | |
| Do | 0.2 | 67 | +10 | 3.2 | 0.3 | 0.07 | 2.75 | |
| Sodium (2-ethyl hexyl) sulfate | 0.1 | 23.2 | +140 | | 0.11 | 0.14 | | 3.2 mg./liter of sulfur. |
| Do | 0.02 | 4.64 | +10 | 2 | 0.234 | 0.6 | 2.72 | 0.64 mg./liter of sulfur. |
| Do | 0.002 | 0.464 | 0 | 2.6 | 0.98 | 0.7 | 2.92 | 0.064 mg./liter of sulfur. |

[1] The initial acidity is always at most 0.1 millimole per liter.
[2] At 20° C. of the plasticized PVC plate '10$^{15}$ ohm/cm.).

It is surprising that in the instances considered here, the emulsifying (undesirable for the decantation) action of certain salts, for example the sodium alkyl sulfate or the sodium alkyl phthalate, is considerably diminished by the effect of the pair, temperature-pressure. This is revealed by the marked decrease, in certain instances, of the duration of the decantation, more particularly in the first separation of the salt-containing water from the raw ester, following the neutralization step, at which time the emulsifying salt content of the mixture is high.

Although temperature and pressure are often factors which increase the mutual solubilities of the substances in contact, it also appears that while the extraction power towards salts, of the salt-containing aqueous phase, increases in the present process, its content of organic substances (ester, alcohol) decreases, probably because of the decrease of emulsifying power of the salts considered.

It follows that in the present process, the time and volume necessary to perform the first decantation are reduced, the number of subsequent methodic washings necessary to remove the salts is diminished, and/or removal is more complete.

The process of the invention may be applied with particular advantage in the case of the production of esters having especially high boiling points, especially those containing an esterified alkyl radical having a comparatively high number of carbon atoms. Such circumstances are usual in ester plasticizers, which are often derived from alcohols containing at least 8 carbon atoms. The alkali metal alkyl salts are tensio-active and act as emulsifiers, especially if the metal is sodium and the alkyl radical contains a high number of carbon atoms. In such instances, accordingly, the first decantation, and as the case may be, the decantation following the first washing, if they are carried out in the conventional manner, at a moderate temperature, are slow and often incomplete. This not only makes it necessary to carry out numerous washing operations after which the subsequent decantations may also be slow and incomplete, or leads to insufficiently washed plasticizers, but also causes losses of valuable products, in emulsified condition, in the discarded salt-containing aqueous phases. Thus, the decantation carried out at an elevated temperature, and preferably under pressure, in accordance with the practice of this invention, saves time by diminishing the number of washings, gives higher yields by reducing the losses in the residual waters, and a lowering of the residual water volume.

decantation following the neutralization step. In industrial practice, it is generally sufficient to carry out this first decantation only at an elevated temperature and under pressure. However, it is possible and it may be advantageous, in certain delicate instances, to apply the principle of the present invention to subsequent decantations following washing operations.

In industrial practice, it is easy to carry out at least the first decantation at an elevated temperature and under pressure. As aforesaid, it is generally advantageous to associate with the previous neutralization of the esterification product, a stabilizing heat treatment. This treatment necessitates an intimate mixure of alkaline aqueous phase and organic phase be maintained at an elevated temperature, namely 130–190° C., and this leads to operation under pressure, namely 3–20 bar (effective). To apply the process of the invention, instead of cooling or allowing the intimate (emulsified) mixture to cool before decantation, the mechanical stirring, which maintains the mixture in the emulsified state, can be stopped and the decantation of the two phases be allowed to proceed substantially at the temperature and under the pressure for the stabilization treatment. The separation of the phases is then very rapid, taking place within less than 10 minutes, and it may suffice simply to withdraw the salt-containing aqueous phase, at the same temperature and under the same pressure, and optionally, to cool it after its withdrawal, if it is desired not to have it boil upon release of the pressure. It is also possible, advantageously, to profit from the heat resulting from the release of this salt-containing aqueous phase, to effect removal therefrom, through entrainment by the steam evolved, the small amounts of distillable organic substances, namely alcohol and/or water entrainer, dissolved in the said aqueous phase.

Operating batchwise, the steps of the treatment, i.e. neutralization and stabilization through heating, may be carried out in a conventional reaction pressure vessel provided with a mechanical stirring device such as a screw or a turbine. When the treatment is at an end, the heating and stirring are stopped and the reaction mixture is allowed to settle for 5–15 minutes. Thereafter, through a withdrawal pipe provided at the bottom of the vessel, the lower layer of salt-containing aqueous phase is withdrawn as easily under the pressure prevailing in the vessel as it would be under atmospheric pressure. In actual practice, during withdrawal of the aqueous phase, the pressure remains almost constant in the vapor phase present in the vessel, because of the revaporization of the water and alcohol present in the vessel.

These and other objects and advantages of this invention will hereinafter appear and, for purposes of illustration, but not of limitation, an embodiment of the invention, in continuous operation, is shown in the accompanying drawings in which—

Figure 2:
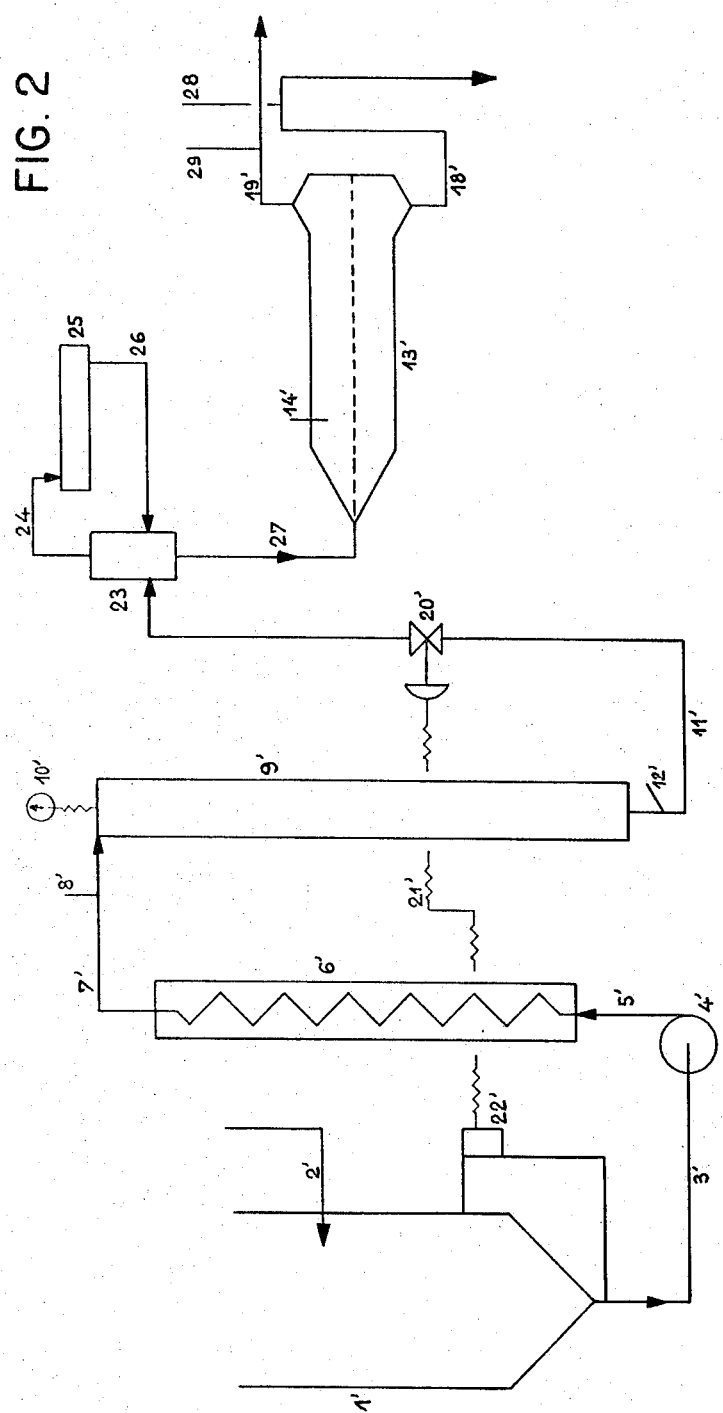

FIG. 1 is a schematic flow diagram illustrating the practice of this invention, and FIG. 2 is a schematic flow diagram illustrating the practice of prior art.

In FIG. 1, the column 1, of which only the lower portion is represented, is the esterification column which receives through pipe 2 the alkaline solution to neutralize the acidity of the raw esterification mixture. This mixture is withdrawn from the bottom of column 1 through pipe 3, is emulsified by pump 4, then passes through pipe 5 through a heater 6 controlled to maintain suitable temperature at the various points of the remainder of the plant, the temperatures being readable by thermometers hereinafter described.

From heater 6, the emulsified mixture passes through pipe 7, provided with thermometer 8, to a neutralization/heating stabilization reactor 9 having a manometer 10 at the top. Preferably, the pressure read by the manometer, which is maintained by pump 4, is higher by 2–5 bar (effective) than the vapor pressure of the mixture at the temperature readable on thermometer 8.

The mixture, subjected to stabilization treatment in reactor 9, issues through pipe 11, provided with a thermometer 12, and is introduced into a horizontal, cylindroconical decenter 13, provided with a thermometer 14. The level of the interface between the upper layer and the lower layer in the decanter is controlled by means of a conventional regulating device 15, which acts electrically through a wire 16, upon a valve 17 inserted in pipe 18 for withdrawal of the lower aqueous phase, so that the interface in the decanter is maintained at about the level of the median plane of the decanter, as represented by a dash line in the drawings. The aqueous phase is advanced through pipe 18, either to a cooler-condenser (not shown) in which it releases and which causes condensation of the vapor evolved by the hot liquid during the release, thus allowing recovery of the valuable products vaporized therein, preferably the unconverted alcohol of the esterification. Instead, the aqueous phase can be advanced to a small distillation column (not shown) in which it releases and which utilizes for its operation, the heat liberated by the release, thus allowing recovery of the valuable products vaporized therein.

The withdrawal of organic phase (the upper layer of the decanter) is effected through pipe 19, controlled by means of a valve 20, which is electrically operated through wire 21 by a regulating device 22, depending on the liquid level in the base portion of column 1. The organic phase is sent through pipe 19 to a methodical washing apparatus (not shown), which subjects this phase to complementary washing. This apparatus may be, for example, a column containing filling materials and fed for countercurrent flow with pure water and the organic phase.

The time necessary for the decantation to take place is generally so short that the total volume of the decanter need not be greater than one-sixth of the total hourly flow rate (in volume) of the mixture to be subjected to decantation.

EXAMPLE 1

Experiment 1

There is treated batchwise, in the apparatus described above, a raw product resulting from the esterification of phthalic anhydride with 2-ethyl hexanol in the presence of sulfuric acid (esterification catalyst) and cyclohexane (water entrainer).

For this purpose, the raw product, which has the following formula:

| | Kg. |
|---|---|
| Di(2-ethyl hexyl) phthalate | 80 |
| Cyclohexane | 12.4 |
| 2-Ethyl hexanol | 6.4 |
| 2-Ethyl hexyl hydrogen phthalate | 0.15 |
| 2-Ethyl hexyl hydrogen sulfate | 1.05 | is placed in the reaction vessel with an alkaline solution comprising:

| | | |
|---|---|---|
| Sodium carbonate (measured as dry) | kg | 1.76 |
| Pure water | liters | 27 |

The resulting mixture is brought to boiling while stirring. The cyclohexane distills off as an aqueous azeotropic mixture, the condensed distillate is subjected to decantation and the aqueous layer produced by this decantation is continuously returned to the reaction vessel.

The temperature of the liquid mixture in the vessel, which is 80° C. when boiling starts, increases up to about 101° C. When the cyclohexane is completely removed, which requires about one hour, the vapor exit from the vessel is shut off and, in order to effect the stabilizing treatment, the temperature of the liquid mixture in the vessel is increased up to 180° C. with stirring. This temperature and the stirring are maintained for one hour and the pressure in the vessel stabilizes at between 9.6 and 10 bar, effective.

Then, the heating and stirring are stopped. After standing for 5 minutes, the lower, aqueous layer is withdrawn immediately cooled, and the vapors evolved by it are condensed. Within 5 minutes, 26 liters of salt-containing aqueous phase, which is slightly yellow and very clear, are withdrawn.

After cooling of the organic phase in the vessel to 95° C., this phase is subjected therein to two successive washings, with 90 liters of water each, at a temperature of 80–90° C., while stirring. The decantations following the washings are very rapid, as can be seen from the speed of the withdrawals; each time, after 5 minutes standing, there is withdrawn within 5 minutes 90 liters of aqueous phase which is only slightly whitish.

To obtain, from the washed organic phase, the final di(2-ethyl hexyl) phthalate, the organic phase is freed from the excess 2-ethyl hexanol by entrainment by steam, then the ester is dried by bubbling air therethrough.

The alkalinity of the various phases withdrawn is determined by hydrolysis of the salts with hydrochloric acid in the presence of Methyl orange as an indicator. It should be noticed that this method does not allow disodium sulfate and sodium (2-ethyl hexyl) sulfate to be determined and, accordingly, only provides a means of comparison between the various experiments carried out.

There is also determined the resistivity of the final di(2-ethyl hexyl) phthalate, as such and after heating thereof for 6 hours at 180° C., to test its stability.

The results of these various determinations are reported in Table II.

The aqueous phase, collected by the first decantation following the stabilization step, is treated with diethyl ether to extract from the said phase the organic products contained therein. The solution in the ether is analyzed through vapor phase chromatography approximately to determine the organic product losses in this aqueous phase.

The results of this analysis are reported in Table III.

Experiment 2

For purposes of comparison with the process of the present invention as illustrated by Experiment 1, the same starting mixture as in Experiment 1 is treated exactly in the same manner as in Experiment 1, up to and including the stabilizing treatment for one hour in the reaction vessel at a temperature of 180° C. under a pressure of 9.6–10 bar, effective.

Thereafter the contents of the vessel are rapidly cooled to 95° C. with stirring. After the cooling and the stirring are stopped, the reaction mixture is allowed to settle for 10 minutes, and the aqueous phase is withdrawn and about 15 liters thereof is rapidly collected. Then the decantation proceeds gradually and it is necessary to wait for 15–20 minutes before it is possible to obtain about 25.2 liters of salt-containing aqueous phase.

Two washings of the organic phase with pure water are effected under the same conditions as in Experiment 1. The decantation following the first washing is rather slow. After 5 minutes, the withdrawal of the aqueous phase is begun but, after 12 minutes, only 81 liters of aqueous phase have been collected, and 90.8 liters after about 20 minutes. The decantation following the second washing is almost as rapid as those in Experiment 1.

The same determination as in Experiment 1 are effected. The results obtained are reported in Tables II and III.

enters decanter 13 (volume of 250 liters), representing a residence time of the mixture in the decanter of about 6 minutes. The salt-containing aqueous layer, withdrawn through pipe 18, represents a volume of 520 liters per hour after cooling to below 100° C. This layer is very clear, and is only slightly whitish after cooling to room temperature.

The organic phase, withdrawn through pipe 19, represents a volume of about 1820 liters per hour. After release and cooling to 98° C., this phase is washed in counter-current flow, in a column containing filling materials and representing two theoretical plates, by 900 liters per hour of hot, pure water, and is then sent to other apparatus for purifying treatment of the phthalate.

The alkalinity of the aqueous phases withdrawn from decanter 13 and from the washing column for the organic phase are determined by the method described in Example 1. The alkalinity of the organic phase issuing from the washing column is, at least theoretically, determined by methodical extraction with pure water, the alkalinity of which is determined. Actually no determinable residual alkalinity is found.

TABLE II

| Experiment No. | Alkalinity of the phases (mN./l.) after each decantation | | | | | | Distribution coefficient [1] | | | Final ester, resistivity at 20° C. (10¹² ohm/cm.) | |
| --- | --- | --- | --- | --- | --- | --- | --- | --- | --- | --- | --- |
| | 1st decantation | | 1st washing | | 2d washing | | 1st decantation | 1st washing | 2d washing | As such | After 6 hrs. at 180° C. |
| | Organic layer | Aqueous layer | Organic layer | Aqueous layer | Organic layer | Aqueous layer | | | | | |
| 1 | 0.105 | 1,020 | #0.01 | 0.1 | #0 | 0.02 | #10,000 | 10 | -------- | 2.5 | 1.6 |
| 2 | 19.7 | 989 | 1.82 | 18 | 0.114 | 1.705 | 50.3 | #10 | #15 | 1.7 | 0.7 |

[1] The distribution coefficient is the ratio, alkalinity in the aqueous layer/alkalinity in the organic layer, after each decantation.

TABLE III

| | Analysis of the aqueous phase after the first decantation | | | |
| --- | --- | --- | --- | --- |
| | Di(2-ethyl hexyl) phthalate | | 2-ethyl hexanol | |
| Experiment No. | Mg./liter | Percent of the total phthalate produced | liter | Percent of the ethylhexanol converted into phthalate |
| 1 | 120 | 0.004 | 50 | 0.0025 |
| 2 | 1,800 | #0.06 | 200 | #0.01 |

EXAMPLE 2

Experiment 3

A raw esterification product analogous to that of Example 1 is treated continuously in the apparatus of FIG. 1.

Into the base portion of column 1 there flows, by reflux through the column, a mixture of:

| | Kg./hour |
| --- | --- |
| Di(2-ethyl hexyl) phthalate | 1600 |
| 2-Ethyl hexanol | 128 |
| 2-Ethyl hexyl hydrogen phthalate | 3 |
| 2-Ethyl hexyl hydrogen sulfate | 21 | i.e. a volume of about 1800 liters, at 20° C. A solution consisting of the following is introduced through pipe 2:

| | Kg./hour |
| --- | --- |
| Sodium carbonate (measured as dry) | 29.4 |
| Water | 540 |

The resulting mixture is intimately emulsified by pump 4 which develops an effective pressure (read on manometer 10) of 15 bar, and is heated to 183° C. (temperature read on thermometer 8) in heater 6. After passing through reactor 9, the mixture issues therefrom at a temperature (read on thermometer 12) of 179–180° C. and The results of these determinations and of the measurement of the resistivity of the final phthalate, and of a PVC plate plasticized with this phthalate are reported in Table IV.

The organic product content of the aqueous layer withdrawn through 18 is also determined by the method described in Example 1. The analysis results are reported in Table V.

Experiment 4

For purposes of comparison with the process of the invention carried out continuously as illustrative above, the same starting mixture as that of Experiment 3 is treated in the conventional type plant represented in FIG. 2 of the drawings. In FIG. 2, the items which are the same as those of FIG. 1 have the same reference numbers but with the prime (') added. The treatment conditions are the same as in Experiment 3 up to and including the stabilizing treatment in the reactor.

At the outlet of reactor 9', the removal of the reaction mixture through pipe 11' is controlled by valve 20', which is electrically operated through wire 21' by regulating device 22'. The mixture passes into a release room 23. The vapors evolved therein pass through a pipe 24 into a condenser 25 in which they are liquefied and the condensate is sent back to room 23 through a pipe 26. The bulk of the liquids from release room 23 is sent through a pipe 27 to decanter 13', the effective volume of which is 500 liters, representing a residence time of the mixture in the decanter of about 12 minutes. Pipes 18' and 19', for aqueous layer withdrawal and organic layer withdrawal, respectively, are each provided with a vent (28 and 29, respectively) communicating with ambient atmosphere.

The decantation in 13' takes place at a temperature between 100° and 95° C. and yields 518 liters per hour of whitish, salt-containing aqueous phase which is withdrawn gravitationally through 18'. The organic phase, the volume of which is 1822 liters per hour, is withdrawn through 19' by overflowing, is sent to a washing column as in Experiment 3 and is washed therein counter-currently with 1650 liters per hour of pure water, then is treated as described in Experiment 3.

The same determinations as in Experiment 3 are effected on the products. The results obtained are reported in Tables IV and V.

The results of the same determinations as in the foregoing examples are reported in Tables VI and VII.

Experiment 6

The apparatus used is of the type shown in FIG. 2, of small size, the decanter 13' having a useful capacity of

TABLE IV

| | Alkalinity of the phases (mN./l.) after each decantation | | | | Distri- bution coeffi- cient 1st decan- tation | Final di(2-ethyl hexyl) phthalate | | |
|---|---|---|---|---|---|---|---|---|
| | 1st decantation | | Washing column | | | Resistivity at 20° C. ($10^{12}$ ohm/cm.) | | Plas- ticized PVC plate 1 |
| Experiment No. | Organic layer | Aqueous layer | Organic layer | Aqueous layer | | As such | After 6 hrs. at 180° C. | |
| 3 | 0.102 | 812 | #0 | 0.2 | 7,950 | 2.5 | 1.8 | 3.05 |
| 4 | 18.27 | 748 | 0.136 | 20.4 | 41 | 1.6 | 1.3 | 2.95 |

1 Resistivity at 20° C. ($10^{15}$ ohm/cm.).

TABLE V

| | Analysis of the aqueous phase from the 1st decantation | | | | |
|---|---|---|---|---|---|
| | Di(2-ethyl hexyl) phthalate | | 2-ethyl hexanol | | |
| Experiment No. | Gram/ liter | Percent of the total phthalate produced | Gram/ liter | Percent of the ethyl hexanol converted to phthlate | Volume of the discarded waters,1 liters |
| 3 | 0.3 | 0.01 | 0.15 | #0.007 | 887 |
| 4 | 5 | 0.16 | 1 | #0.05 | 1,360 |

1 Water from the 1st decantation plus washing water per metric ton of phthalate produced.

EXAMPLE 3

Experiment 5

The apparatus used is of the type shown in FIG. 1, but of small size, with the decanter 13 having a useful capacity of 2 liters. The apparatus is entirely heat-insulated to minimize the heat losses through radiation.

A raw esterification product of phthalic anhydride and tridecanol is treated continuously in this apparatus.

The mixture fed to pump 4 has the following composition:

|  | Kg./hour |
|---|---|
| Di-tridecyl phthalate | 6.95 |
| Cyclohexane | 1.03 |
| Tridecanol | 0.53 |
| Tridecyl hydrogen phthalate | 0.004 |
| Tridecyl hydrogen sulfate | 0.11 |
| Water | 2.8 |
| Sodium carbonate (measured as dry) | 0.13 |

This mixture, intimately emulsified by the pump 4, develops an effective pressure (read on 10) of 15 bar, and is heated (in 6) to 185° C. (temperature read on 8). After passing through 9, the mixture issuing at a temperature (read on 12) of 181° C. passes to decanter 13, in which its residence time is approximately 10 minutes. The volume and the flow rates indicated above, are for a temperature of 20° C.

The salt-containing aqueous layer, withdrawn through 18, after cooling, has a volume of 2.75 liters per hour. This layer issues turbid and whitish, but on standing no separation for decantation takes place therein.

The organic layer withdrawn through 19, after cooling, has a volume of 9.25 liters per hour. This layer is washed twice, batchwise, in a vessel provided with a turbine stirrer, each time with its own volume of distilled water at 80° C. with stirring for 10 minutes. After each washing, the decantation takes place cleanly and rather quickly (a quarter of an hour at the utmost).

2 liters and the apparatus being entirely heat-insulated, as in Experiment 5.

The same raw esterification product as in Experiment 5 is treated continuously in this apparatus but at a lower flow rate, the mixture fed to pump 4' having the following composition:

|  | Kg./hour |
|---|---|
| Di-tridecyl phthalate | 5.82 |
| Cyclohexane | 0.863 |
| Tridecanol | 0.445 |
| Tridecyl hydrogen phthalate | 0.0033 |
| Tridecyl hydrogen sulfate | 0.092 |
| Water | 2.3 |
| Sodium carbonate (measured as dry) | 0.108 |

The operating conditions are the same as in Experiment 5, up to and including the stabilizing treatment in the reactor.

The mixture withdrawn from reactor 9', after being released and cooled in 20', 23 and 25, is introduced at a temperature of 100°±1° C. into decanter 13', in which its residence time is approximately 12 minutes.

The salt-containing aqueous layer withdrawn through 18' with a flow rate of 2 liters per hour is very white and 64 ml. of organic phase separates slowly therefrom (within 10-12 hours). This slowly separated organic phase has a specific weight of approximately 0.938 at 20° C., and analysis (chromatography and Fischer) shows that it has approximately the following composition:

|  | Percent by weight |
|---|---|
| Di-tridecyl phthalate | 91 |
| Tridecanol | 5 |
| Cyclohexane | 3 |
| Water | 1 |

The organic layer withdrawn through 19' at a flow rate of 8 liters per hour is also quite white. For washing it, as such, batchwise, it is not possible to use the vessel with turbine stirrer which was used in Experiment 5 because the mixture of equal volumes of water and this organic phase, at 80–90° C., gives rise to a persistent emulsion with a significant foam layer. By very moderate stirring of the two phases, for example merely by gentle boiling under reflux, it is possible to perform the first two washings and the corresponding decantations. It is possible to obtain a final organic phase containing the same residual alkalinity as that of Experiment 5, but at the expense of five washings with an equal volume of water; the last three washings may be carried out in the vessel with turbine stirrer, with gentle boiling under reflux.

The results of the same determinations as in the foregoing experiments are reported in Tables VI and VII. It should be noted that the organic product content of the aqueous layer withdrawn from decanter 13' was determined after separation of the aqueous phase from the slowly separated organic phase, as aforesaid, after 12 hours.

1. The resistivity of the final phthalate, as such and after 6 hours heating at 180° C., is also determined as in Example 1, to test its stability.

TABLE VI

| Experiment No. | Alkalinity of the phases (mN./liter) after each decantation | | | | | | | |
|---|---|---|---|---|---|---|---|---|
| | Issuance from decanter | | 1st washing | | 2d washing | | 3d washing | |
| | Organic layer | Aqueous layer | Organic layer | Aqueous layer | Organic layer | Aqueous layer | Organic layer | Aqueous layer |
| 5 | 0.35 | 708 | 0.017 | 0.333 | 0.0016 | 0.0154 | | |
| 6 | 33.5 | 705 | 6.1 | 27.5 | 1.015 | 5.075 | 0.132 | 0.885 |

| Experiment No. | Alkalinity of the phases (mN./liter) after each decantation | | | | Distribution coefficient | | | | | |
|---|---|---|---|---|---|---|---|---|---|---|
| | 4th washing | | 5th washing | | | Washings | | | | |
| | Organic layer | Aqueous layer | Organic layer | Aqueous layer | Decanter | 1st | 2d | 3d | 4th | 5th |
| 5 | | | | | #2,000 | 19.6 | 9.6 | | | |
| 6 | 0.0147 | 0.117 | 0.0016 | 0.13 | 21 | 4.5 | 5 | 6.7 | 8 | 8 |

TABLE VII

| | Analysis of the aqueous layer after the first decantation | | | | | | |
|---|---|---|---|---|---|---|---|
| | Di-tridecyl phthalate | | Tridecanol | | Cyclohexane | | |
| Experiment No. | Grams per liter | Percent of the treated phthalate | Grams per liter | Percent of the alcohol converted to phthalate | Grams per liter | Grams per kg. of treated phthalate | Volume of discarded waters,[1] liters | Remarks |
| 5 | 5 | #0.2 | 1.5 | #0.08 | 0.5 | 0.2 | 3 | |
| 6 | (1) 27.3 (2) +12 | | (1) 1.5 (2) +1.2 | | (1) 0.9 (2) +0.5 | | 7 | (1) Products slowly separated after 12 hours. (2) Remaining products, in dissolved and emulsified state. |
| Total | 39.3 | 1.55 | 2.7 | 0.14 | 1.4 | 0.55 | | |

[1] Water from the first decantation plus washing waters, per kg. of treated phthalate.

EXAMPLE 4

Experiment 7

A raw esterification product analogous to that of Example 1 is treated continuously in the apparatus of FIG. 1.

Into the base portion of column 1 there flows, on the one hand, by reflux through the column, a mixture of:

| | Kg./hour |
|---|---|
| Di(2-ethyl hexyl) phthalate | 2292 |
| 2-Ethyl hexanol | 184 |
| 2-Ethyl hexyl hydrogen phthalate | 5.7 |
| 2-Ethyl hexyl hydrogen sulfate | 34 | i.e. a volume of about 2585 liters, measured at 20° C., and on the other hand, there is introduced through pipe 2, a solution consisting of:

| | Kg./hour |
|---|---|
| Sodium carbonate (measured as dry) | 23.1 |
| Water | 775 |

The resulting mixture, intimately emulsified by pump 4 which develops an effective pressure (read on 10) of 15.5 bar, is heated to 180° C. (temperature read on 8) in heater 6. After passing through reactor 9, the mixture issues therefrom at a temperature (read on 12) of 174° C. and enters decanter 13 the useful volume of which is about 480 liters, representing a residence time of the mixture in the decanter of 8.6 minutes. The salt-containing aqueous layer, withdrawn through 18, represents a volume of 746 liters per hour after cooling to below 100° C.

The organic phase, withdrawn through 19, represents a volume of 2614 liters per hour. After release and cooling to 98° C., this phase is washed counter-currently with 260 liters per hour of hot, pure water, then is sent to further apparatus for purifying treatment of the phthalate.

The alkalinity of the phases withdrawn from decanter 13 is determined by the method described in Example 1. The resistivity of the final phthalate, as such and after 6 hours heating at 180° C., is also determined as in Example 1, to test its stability.

The results of these various determinations are reported in Table VIII.

TABLE VIII

| Experiment No. | Alkalinity of the phases (mN./liter) after the first decantation | | Distribution coefficient first decantation | Final di(2-ethyl hexyl) phthalate—Resistivity at 20° C. ($10^{12}$ ohm/cm.) | |
|---|---|---|---|---|---|
| | Organic layer | Aqueous layer | | As such | After 6 hrs. at 180° C. |
| 7 | 0.122 | 291 | 2,385 | 6.6 | 1.65 |
| 8 | 17.82 | 230 | 12.9 | 0.37 | 0.10 |

Experiment 8

For comparison, the same starting mixture as that of Experiment 7 is treated in the apparatus of FIG. 2 exactly in the same manner as in Experiment 7 up to and including the stabilizing treatment in the reactor.

The mixture withdrawn from reactor 9', after being released and cooled in 20', 23 and 25, is introduced at a temperatrue of 80° C. into decanter 13' in which its residence time is 8.6 minutes. The salt-containing aqueous layer is withdrawn through 18' and the organic layer is washed, then treated as in Experiment 7.

The same determinations as in Experiment 7 are effected on the products. The results thereof are reported in Table VIII.

EXAMPLE 5

Experiment 9

There is treated continuously, in the apparatus of FIG. 1, a raw product resulting from the esterification of sebacic acid with 2-ethyl hexanol in the presence of sulfuric acid.

Into the base portion of column 1, there flows, by reflux through the column, a mixture of:

| | Kg./hour |
|---|---|
| Di-(2-ethyl hexyl) sebacate | 1700 |
| 2-Ethyl hexanol | 127 |
| 2-Ethyl hexyl hydrogen sebacate | 2.5 |
| 2-Ethyl hexyl hydrogen sulfate | 8.5 | i.e. a volume of about 2023 liters, measured at 20° C., introduced through pipe 2, is a solution consisting of:

| | Kg./hour |
|---|---|
| Sodium carbonate (measured as dry) | 12.7 |
| Water | 600 |

The operation is carried out under substantially the same conditions as in Experiment 3 (Example 2), with an effective pressure (read on manometer 10) of 15 bar, a heating temperature (read on thermometer 8) of 182–183° C., and a residence time in decanter 13 (the useful volume of which is 250 liters) of about 5.5 minutes. The salt-containing aqueous layer, withdrawn through pipe 18, represents a volume of 583 liters per hour after cooling to 98° C., and the organic phase, withdrawn through pipe 19, represents a volume of 2040 liters per hour after cooling to 98° C. After release and cooling to 95° C., this organic phase is washed counter-currently, in the same column containing filling materials as in Experiment 3, with 400 liters per hour of hot, pure water; then is sent to further apparatus for purifying treatment of the sebacate; alcohol removal, drying, treatment with decolorizing black, and filtration.

The alkalinity of the phases, withdrawn from decanter 13, is determined by the methods described in Example 1. The resistivity of the final sebacate produced as such and after heating for 6 hours at 180° C., is also determined, as in Example 1, to test its stability.

The results of these various determinations are reported in Table IX.

Experiment 10

For comparison, the same starting mixture as that of Experiment 9, is treated in the apparatus of FIG. 2, exactly in the same manner as in Experiment 9 up to and including the stabilizing treatment in the reactor.

The mixture withdrawn from reactor 9', after being released and cooled in 20', 23 and 25, is introduced at a temperature of 90° C. into decanter 13' in which its residence time is 11 minutes. The salt-containing aqueous layer (573 liters per hour) is withdrawn through 18' and the organic layer (2050 liters per hour) is washed, then treated as in Experiment 9.

The same determinations as in Experiment 9 are effected on the products. The results thereof are reported in Table IX.

TABLE IX

| Experiment No. | Alkalinity of the phases (mN./liter) after the first decantation | | Distribution coefficient first decantation | Final di(2-ethyl hexyl) sebacate—Resistivity at 20° C. (10¹² ohm/cm.) | |
|---|---|---|---|---|---|
| | Organic layer | Aqueous layer | | As such | After 6 hrs. at 180° C. |
| 9 | 0.07 | 343 | 4,900 | 10 | 3.5 |
| 10 | 10.4 | 312 | 30 | 3 | 1.8 |

EXAMPLE 6

Experiment 11

There is treated, batchwise, in the same apparatus as in Example 1, a raw product resulting from the esterification of azelaic acid with nonanol in the presence of sulfuric acid and cyclohexane.

For this purpose, the raw product, which has the following composition:

| | Kg. |
|---|---|
| Di-nonyl azelate | 88 |
| Cyclohexane | 12.5 |
| Nonanol | 8.75 |
| Nonyl hydrogen azelate | 0.19 |
| Nonyl hydrogen sulfate | 0.45 | is placed in the reaction vessel with an alkaline solution comprising:

| | Kg. |
|---|---|
| Sodium carbonate (dry weight) | 0.83 |
| Water | 37 | representing, in volumes measured at 20° C., about 124 liters of organic phase and 37 liters of aqueous phase.

The operation is carried out substantially as in Example 1, i.e., bringing the mixture to boiling, removing the cyclohexane by azeotropic distillation, then heating the liquid in the reaction vessel at 170° C. for one hour, while stirring, under an effective pressure between 7.5 and 8 bar. Then, after 5 minutes standing, there is withdrawn, within 5 minutes, 35 liters of yellow an opalescent aqueous phase which is cooled as it is withdrawn.

After cooling of the organic phase in the vessel to 95° C., this phase is subjected to three successive washings, each time with 50 liters of water, at a temperature of 90–95° C., with stirring. The subsequent decantations are very rapid and efficient, as in Experiment 1 (Example 1).

To obtain the final dinonyl azelate, there is effected on the product an alcohol removal, a drying, a treatment with decolorizing black and alumina, and a filtration.

The alkalinity of the decanted phases is determined by the methods described in Example 1. The resistivity of the final azelate, as such and after heating for 6 hours at 180° C., is also determined.

The results of these various determinations are reported in Table X.

TABLE X

| Experiment No. | Alkalinity of the phases (mN./liter) after the first decantation | | Distribution coefficient first decantation | Washings | | | Di-nonyl azelate—Resistivity at 20° C. (10¹² ohm/cm.) | |
|---|---|---|---|---|---|---|---|---|
| | Organic layer | Aqueous layer | | No. | Total volume of water per volume of raw water | Alkalinity (mN./liter) of the last washing water | As such | After 6 hrs. at 180° C. |
| 11 | 0.195 | 388 | #2,000 | 3 | 1.2 | 0.02 | 35 | 25 |
| 12 | 14.2 | 357 | 25.2 | 4 | 2.4 | 0.05 | 5 | 4 |

Experiment 12

For comparison, the same starting mixture as that of Experiment 11 is treated exactly in the same manner as in Experiment 11 up to and including the stabilizing treatment for one hour in the reaction vessel at a temperature of 170° C. under a pressure of 7.5–8 bar, effective.

Then, the contents of the vessel are rapidly cooled to 95° C. with stirring. After the cooling and the stirring are stopped, the reaction mixture is allowed to settle for 10 minutes, and the aqueous phase is withdrawn. After 20 minutes, there has been obtained 33 liters of very turbid, salt-containing aqueous phase.

The organic phase is treated, as described in Experiment 11, except that it is necessary to subject it to four successive washings, each time with 75 liters of water, at a temperature of 90–95° C., with stirring, in order that the last washing water contain no more than 0.05 milliequivalent of alkalinity per liter.

The alkalinity of the decanted phases is determined by the methods described in Example 1. The resistivity of the final azelate, as such and after heating for 6 hours at 180° C., is also determined.

The results of these various determinations are reported in Table X.

EXAMPLE 7

Experiment 13

There is treated continuously, in the apparatus of Experiment 5 (Example 3), a raw product resulting from the esterification of trimellitic anhydride with 8–10 Alfols. Alfols are alcohols or mixtures of alcohols which are primary, aliphatic, straight-chain alcohols produced from olefins (ethylene) by the Ziegler process.

The Alfol distillation cut utilized here is a mixture consisting of:

traces of $C_6$ Alfol
about 48% by weight of $C_8$ Alfol
about 52% by weight of $C_{10}$ Alfol
traces of $C_{12}$ Alfol According to the hydroxyl number of this mixture, the average molecular weight of the component alcohols is 145.

The mixture fed to pump 4 has the following composition:

|  | Kg./hour |
|---|---|
| Alfol trimellitates | 5.9 |
| Cyclohexane | 0.78 |
| Unconverted Alfols | 0.403 |
| Di-alkyl hydrogen trimellitates | 0.023 |
| Alkyl hydrogen sulfates | 0.025 |
| Di-alkyl sulfates | 0.028 |
| Water | 2.3 |
| Sodium carbonate (dry weight) | 0.052 | i.e. about 7.68 liters per hour of organic phase and 2.3 liters per hour of aqueous phase.

This mixture, which is intimately emulsified by the pump 4 develops an effective pressure (read on 10) of 15 bar, and is heated (in 6) to 170° C. (temperature read on 8). After passing through 9, the mixture, issuing at a temperature (read on 12) of 168° C., passes to decanter 13 in which its residence time is 12 minutes. The volume and the flow rates indicated above are expressed as at a temperature of 20° C.

The salt-containing aqueous layer, withdrawn through 18, has, after cooling, a volume of 2.22 liters per hour. This layer is turbid, whitish, foamy, but does not decant further after standing cold for several hours.

The very white organic layer withdrawn through 19 has, after cooling, a volume of 7.76 liters per hour. This layer is then treated batchwise in the following way:

1. A washing with 0.6 time its own volume of water, in an autoclave provided with a mechanical stirrer, for 15 minutes at a temperature of 120° C. under an absolute pressure of about 2 bar. Then the mixture is allowed to decant for 5 minutes and the aqueous phase is withdrawn, at the same temperature and under the same pressure.

2. Then, two successive washings, each with 0.6 volume of water, as for the preceding one, in a vessel with mechanical stirring, each time for 10 minutes at a temperature of approximately 80° C.

3. Finally, removal of the cyclohexane by azeotropic distillation with water, then the ester is subjected, by conventional techniques, to alcohol removal, drying, treatment with decolorizing black, and filtration.

The alkalinity of the decanted phases is determined by the methods described in Example 1. The resistivity of the final product, as such and after heating for 6 hours at 180° C., is also determined.

The results of these various determinations are reported in Table XI.

Experiment 14

The apparatus used is of the type of that of FIG. 2, of small size, the decanter 13' having a useful capacity of 5 liters and the apparatus being entirely heat-insulated, as in Experiment 5 (Example 3).

The same raw esterification product, as in Experiment 13, is treated in this apparatus exactly in the same manner as in Experiment 13 up to and including the stabilizing treatment at 170° C. under 15 bar.

The mixture withdrawn from reactor 9', after being released and cooled in 20', 23 and 25, is introduced at a temperature of 86° C. into decanater 13' in which its residence time is approximately 30 minutes.

The salt-containing aqueous layer, withdrawn through 18', is very white and has a volume of only 0.7 liter per hour instead of the expected 2.3 liters.

The organic layer withdrawn through 19', with a flow rate of 9.28 liters per hour is, in fact, an emulsion containing the $70/100$ of the aqueous phase introduced on starting. To bring to an end the decantation of this layer, it is necessary to add 50 to 100 grams per liter of crystallized sodium chloride, to stir the resulting mixture for 10 minutes, then to allow it to settle for 15–20 minutes.

For the subsequent washings, performed at 80° C., each time, utilization of a volume of pure water equal to the volume of organic layer to be washed, it is still necessary, at least for the first washing, to add sodium chloride for bringing the decantation to an end, then to effect six further washings in order that the last aqueous phase obtained have the ordinarily desired low alkalinity, i.e. $\leqslant 0.02$ milliequivalent per liter.

The alkalinity of the decanated phases is determined by the methods described in Example 1. The resistivity of the final product, as such and after heating for 6 hours at 180° C., is also determined.

The results of these various determinations are reported in Table XI.

TABLE XI

| Experiment No. | First decantation | | | | Distribution coefficient first decantation | Washings | | Trimellitate obtained—resistivity at 20° C. ($10^{12}$ ohm/cm.) | |
|---|---|---|---|---|---|---|---|---|---|
|  | Organic layer | | Aqueous layer | | | | | | |
|  | Emulsified water (percent) | Alkalinity (mN./liter) | Percent of the starting aqueous phase | Alkalinity (mM./liter) | | No. | Total volume of water per volume of raw ester | As such | After 6 hrs. at 180° C. |
| 13 | 1 | 2.85 | 96.5 | 341 | 120 | 3 | 1.8 | 3 | 2.5 |
| 14 | 17.3 |  | 30 |  | (¹) | 7 | ²7 | 0.7 | 1 |

¹ Not determined because the decantation is incomplete.
² There is needed a total amount of sodium chloride of at least 100 grams per liter of raw ester to be treated (including the sodium chloride used for the first decantation).

All these examples show the striking superiority of the decantation process of the present invention over conventional technique.

We claim:
1. In a process for purification of high boiling esters produced by esterification of an aromatic or aliphatic organic mono or poly carboxylic acid or its anhydride having 6 or more carbon atoms by an aliphatic monohydric or polyhydric alcohol having at least 8 carbon atoms, in the presence of an esterification catalyst, followed by neutralization of the reaction product, heating to 130–190° C. and decantation of the latter to separate therefrom an organic phase and an aqueous phase, the im- provement which comprises performing the decantation step under positive pressure at a temperature within the range of 120–200° C.

2. A process as claimed in Claim 1 in which the organic carboxylic acid is selected from the group consisting of phthalic acid, 2-ethyl hexanoic acid, adipic acid, sebacic acid, azelaic acid and trimellitic acid.

3. A process as claimed in Claim 1 in which the esterification catalyst is sulfuric acid.

4. A process as claimed in Claim 1 in which the decantation step is performed at a temperature within the range of 150–190° C.

5. A process as claimed in Claim 1 in which the decantation step is carried out under a pressure within the range of 3–20 bar, effective.

6. A process as claimed in Claim 1 which includes the step, after the decantation step, of washing the organic phase at least once with hot water.

7. A process as claimed in Claim 6 wherein the organic phase is washed with water at a temperature within the range of 60° C. to near 100° C., at atmospheric pressure, with subsequent decantation of the phases under the same conditions.

8. A process as claimed in Claim 6 wherein the organic phase is washed with water at a temperature of at least 100° C. and under pressure, with subsequent decantation of the phases under the same conditions.

9. A process as claimed in Claim 8 wherein the washing temperature is within the range of 120–200° C.

10. A process as claimed in Claim 9 wherein the temperature is within the range of 150–190° C.

11. A process as claimed in Claim 8 wherein the washing is performed under a pressure within the range of 3–20 bar, effective.

12. A process as claimed in Claim 6 wherein the washing or washings is or are carried out continuously in counter-current flow.

13. A process as claimed in Claim 1 wherein the heating to 130–190° C. of the neutralized mixture is carried out under a pressure within the range of 3–20 bar, effective, and the decantation of this mixture is performed just after the said heating, without cooling or release of the mixture.

14. A process as claimed in Claim 1 wherein the withdrawn aqueous layer of the mixture which has been neutralized, then heated to 130–190° C. and decanated, is released, which includes the step of removing the distillable organic products from the aqueous layer by entrainment of the steam evolved from the release into the aqueous layer.

15. A process as claimed in Claim 14 wherein the aqueous layer withdrawn under pressure is introduced into a cooler-condenser in which it releases and which causes condensation and allows recovery of the valuable products vaporized therein.

16. A process as claimed in Claim 14 wherein the aqueous layer withdrawn under pressure is introduced into a small distillation column in which it releases and which utilizes for its working the release heat and allows recovery of the valuable products vaporized therein.

17. A process as claimed in Claim 1 wherein the esterification is performed continuously in a column and the decantation of the mixture which has been neutralized, then heated to 130–190° C. is performed continuously in a horizontal, cylindro-conical decantation zone in which the level of the interface between the upper layer and the lower layer is controlled by means of a conventional regulating device acting upon the withdrawal of the lower, aqueous layer so that the interface in the decantation zone is kept at about the level of the median plane of this zone, while the withdrawal of the upper, organic layer is acted upon by another conventional regulating device according to the liquid level in the base portion of the esterification column.

References Cited
UNITED STATES PATENTS 2,805,246    3/1957    Bourguignon et al. __ 260—485 S

FOREIGN PATENTS 57,596    9/1967    Germany _____ 260—475 B

LORRAINE A. WEINBERGER, Primary Examiner

E. J. SKELLY, Assistant Examiner

U.S. Cl. X.R.

203—37, 39, 96; 260—410.6, 410.9 R, 475 PR, 485 S, 499

UNITED STATES PATENT OFFICE
CERTIFICATE OF CORRECTION

Patent No. 3,849,475           Dated November 19, 1974

Inventor(s)  Paul Biarnais et al.

It is certified that error appears in the above-identified patent and that said Letters Patent are hereby corrected as shown below:

column 7, Table III, under the heading 2-ethyl hexanol, change "liter" to --- mg/liter ---

Signed and sealed this 15th day of April 1975.

(SEAL)
Attest:

RUTH C. MASON
Attesting Officer

C. MARSHALL DANN
Commissioner of Patents
and Trademarks